June 25, 1968          A. K. BEY          3,389,611
ELECTRIC MOTOR
Filed Dec. 6, 1965          2 Sheets-Sheet 1
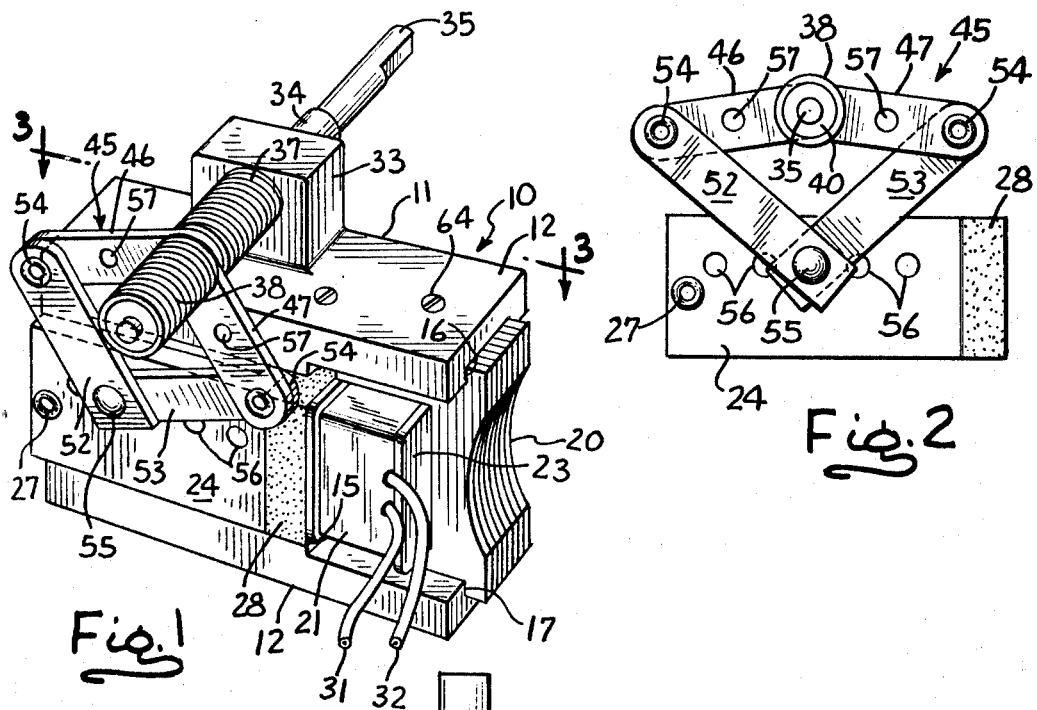
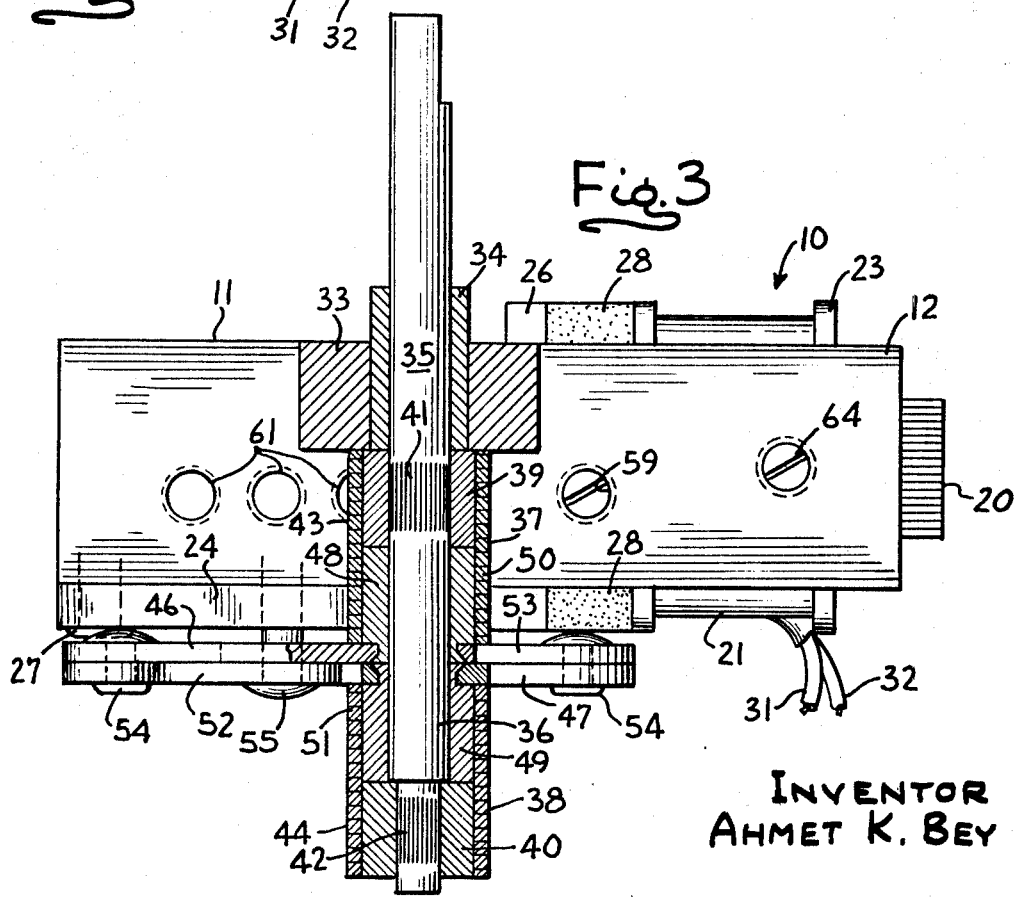
INVENTOR
AHMET K. BEY

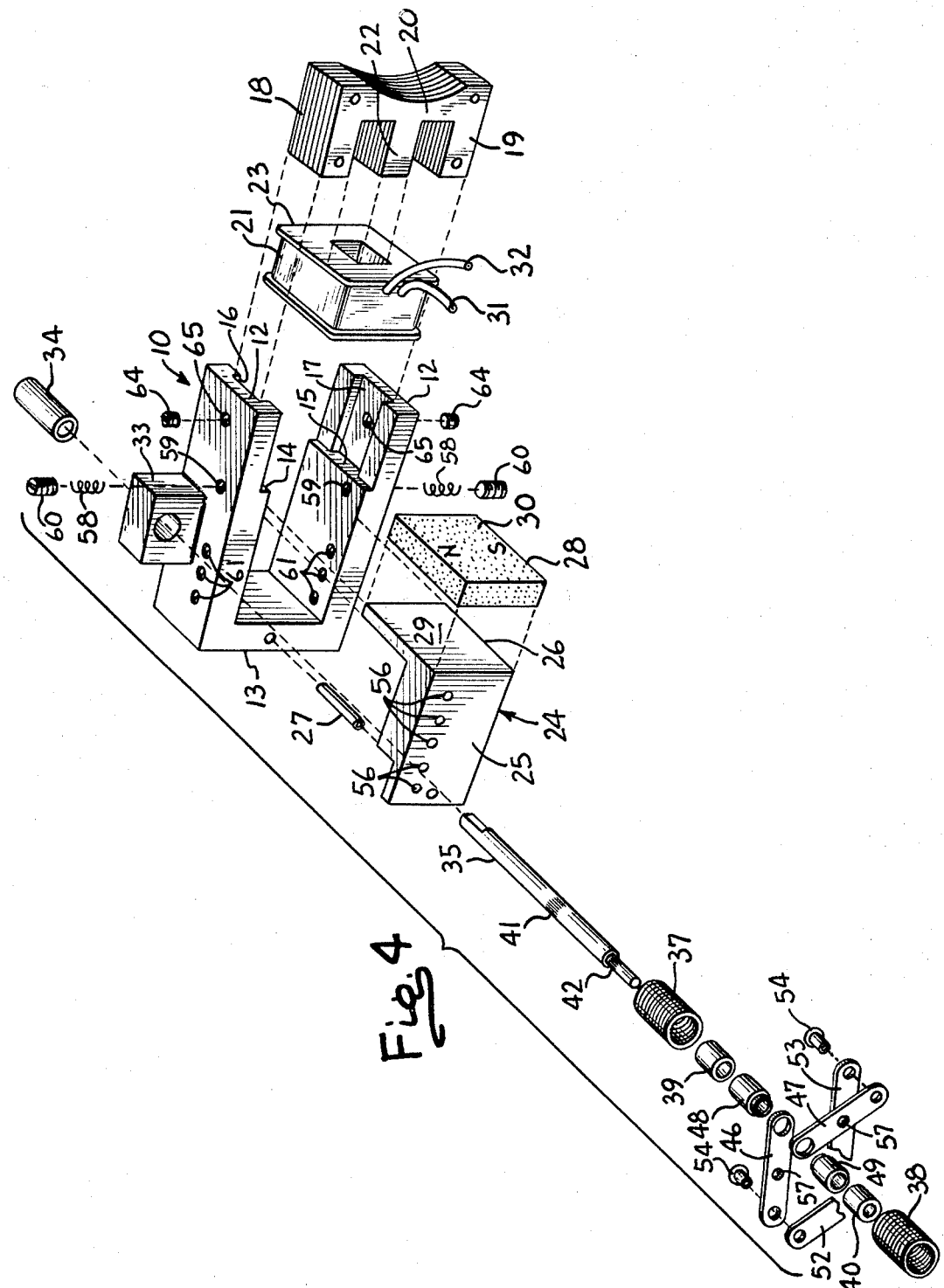

United States Patent Office 3,389,611
Patented June 25, 1968

3,389,611
ELECTRIC MOTOR
Ahmet K. Bey, Chicago, Ill., assignor of
one-half to Frances Budreck
Continuation-in-part of application Ser. No. 489,178,
Sept. 22, 1965. This application Dec. 6, 1965, Ser.
No. 511,760
6 Claims. (Cl. 74—88)

ABSTRACT OF THE DISCLOSURE

The leg members of a vibratory motor alternately attract and repel a pivoted permanent magnet member when a coil wound around the leg members is coupled to a source of alternating current. A pair of scissors-like linkages translate the oscillatory motion of the permanent magnet member to a pair of oppositely wound spring clutches which alternately engage an output shaft to produce uni-directional rotation.

---

This application is a continuation-in-part of my co-pending application "Motor Clutch," Ser. No. 489,178, filed Sept. 22, 1965.

The present invention relates to motors. Particularly the invention relates to motors which are adapted for motivation by alternating electrical current. Specifically the invention relates to motors of the class having clutch spring means for conversion of an alternating input force to a single directional output torque.

In co-pending application Ser. No. 489,178, filed by the present applicant Sept. 22, 1965, there is taught motive means adapted for single directional output by conversion of both phases of alternating input forces through employment of clutch spring means. In the specific embodiment illustrated in said co-pending application, the clutch spring means comprises a pair of clutch springs which are wound in the same direction. Moreover, the character of the output torque is controllable only by a pair of opposed adjustable compression springs or snubber members which limit the amplitude of the alternations of an oscillator mechanism which is employed to convert alternating electrical current into an alternating or oscillating mechanical force. Anent the latter, better control of output torque characteristics is desirable.

It is a feature of the invention described in the present application, which is considered a continuation in part of said co-pending application, that the clutch spring means comprise a pair of oppositely wound clutch springs which convert alternating input force into single directional output torque by employing the energy of both phases of such alternating force.

It is a further object of the present invention to provide improved means in a motor of the described class for impressing the force of an oscillator on the motor output shaft.

It is another object of the invention to provide in a motor of the indicated class improved means for controlling the speed of rotation of its output shaft and output torque.

Additionally, it is an object of the present invention to provide for adjustment of said last mentioned means, whereby output force having a range of characteristics is available in a motor of the described class.

The foregoing and other objects, features, and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a perspective view of a motor embodying one form of the present invention.

FIG. 2 is an elevational view of a portion of said motor showing its oscillator and the connected together arms through which oscillator torque is transmitted to the output shaft of said motor.

FIG. 3 is a sectional view transversely of the bearing block in which the output shaft is supported, taken substantially on the plane designated by the line 3—3 in FIG. 1 and looking in the direction of the arrows.

FIG. 4 is an exploded perspective view of said motor.

Referring now more particularly to the drawings, the motor 10 which exemplifies the invention comprises a U-shaped housing 11 having what may be considered opposite housing sides 12, 12 and an integral connecting portion 13 which closes said housing at one end, as illustrated in FIG. 4. The opposite end of said housing, as well as what may be considered front and rear of said housing, may be open. Facing parts of the sides 12, 12 may be cut away adjacent the open end of the housing 11 to generate a pair of shoulders 14 and 15 medially of the opposite ends of said housing sides. Moreover, said housing sides 12, 12 may be fashioned with a pair of channels 16 and 17, respectively, which extend from the open end of the housing 11 to said shoulders 14 and 15, said channels 16 and 17 being proportioned to snugly receive the opposite outer legs 18 and 19 of a conventional E-shaped laminations member 20 which may be inserted in said housing from its open end.

As illustrated in FIGS. 1 and 4, the shoulders 14 and 15 serve as abutments to limit the inward movement of the laminations member 20, whereby the same will be held in the exemplified embodiment at one end of the housing 11. A conventional reel-wound coil 21 is mounted in said housing about the medial leg 22 of said laminations member 20, the reel 23 of said coil 21 being proportioned for a snug fit in the spaces between the legs 18, 19 and 22 of said laminations member, preferably with not part of the reel extending inwardly of the housing 11 beyond the inner end of said laminations member. To facilitate retention of the laminations member 20, a pair of opposed set screws 64, 64 which are adjustable in internally threaded apertures 65, 65 in the housing sides 12, 12 are provided, as illustrated in FIG. 4.

As illustrated in FIG. 4, an L-shaped oscillator or rockable member 24, which comprises an outer leg 25 and an inner leg 26 disposed normally to each other, has its outer leg 25 rockably connected to the connecting portion 13 of housing 11 by suitable pivot means 27. The oscillator or rockable member 24 may be of soft steel fabrication to the end that its leg 26, which is disposed in said housing spaced by leg 25 from housing connecting portion 13, will serve to reinforce the magnetic field of a permanent magnet 28 which is secured by suitable means, such as cement or the like, to the outer face 29 of said leg 26 between housing sides 12, 12. The oscillator or rockable member 24 is proportioned in a manner such that when it is operatively conditioned, as in FIGS. 1, 2 and 3, the outer face 30 of the permanent magnet 28 will be disposed adjacent the exposed end face of the reel 23 which in the instant embodiment is substantially at the level of the shoulders 14 and 15, as illustrated in FIG. 1. Moreover, as illustrated in FIG. 4, the magnet 28 is polarized in a manner such that one pole is disposed adjacent the leg 18 and the other pole is disposed adjacent the leg 19 of said laminations member 20. The polar arrangement of the exemplified embodiment has been conventionally designated N and S in FIG. 4. It is appreciated, however, that the poles may be reversed. Furthermore, the permanent magnet as well as leg 26 are proportioned to permit rocking thereof within housing 11, the opposite poles being alternately attracted to and repelled from legs 18 and 19 of the laminations member 20 as the coil 21 is charged with an alternating current through source-connectible wires 31 and 32 which are shown only partially in FIGS. 1, 3 and 4.

A journalling block 33, which is shown as being formed integrally with one of housing sides 12, is lined with an anti-friction bearing sleeve 34 which rotatably supports an output shaft 35 transversely of housing 11. The work end portion 36 of the output shaft 35 has a medial part which is spaced from and in alignment with the leg 25 of the oscillator or rockable member 24, said work portion 36 being disposed transversely of a plane defined by said leg 25. A pair of opposed collars 39 and 40 are press fit in longitudinally spaced apart disposition on the work portion 36 of said output shaft whereby said collars are constrained for rotation with said shaft which may be knurled as at 41 and 42 to facilitate collar retention.

A pair of oppositely wound clutch springs 37 and 38 are arranged about the work portion 36 of the output shaft in axially spaced apart disposition relative thereto. The opposite end portions 43 and 44 are operably disposed on the collars 39 and 40, respectively, as illustrated in FIG. 3, and their adjoining end portions 50 and 51 being spaced apart to accommodate therebetween a scissors-like force transmission mechanism which is generally designated 45.

As illustrated, said force transmission mechanism comprises a pair of arms 46 and 47 which extend radially outwardly from the work end portion of the shaft 35. The central end portions of said arms 46 and 47 are anchored to the facing end portions of a pair of hub-like extensions or collars 48 and 49, as clearly illustrated in FIG. 3. Said hub-like extensions 48 and 49 are mounted axially about the output shaft work portion 36 and arranged for rotation thereon, said hub extensions or collars 48 and 49 being arranged within the facing end portions 50 and 51 of the clutch springs 37 and 38 in alternately releasable and clutchable association according to the rotational direction of said collars or hub extensions 48 and 49.

By reason of the foregoing arrangement of parts, including the opposite directions of the windings of the clutch springs, as the arm 46 is motivated to rock its collar or hub extension 48 in one rotational direction, for example, clockwise with respect to FIG. 1, clutch spring 37 will tighten on said last mentioned collar and cause the output shaft 35 to rotate correspondingly. As the arm 46 is motivated to rock the hub extension or collar 48 in an opposite direction, collar 48 will slip in the clutch spring 37 and the torque of arm 46 will have no effect on motivation of the output shaft. As the arm 47 is motivated to rock the collar or hub extension 49 in one direction, for example counterclockwise with respect to FIG. 1, said last mentioned collar will slip within the coils of the clutch spring 38 and has no motivating effect on the output shaft 35. On the other hand, as the arm 47 is motivated to rock its collar or hub extension 49 oppositely, for example clockwise, it will cause tightening of the clutch spring 38 on said last mentioned collar to motivate the output shaft in a clockwise direction. It is appreciated that by reversing the direction of the windings of the clutch springs 37 and 38 from that shown in the drawings and heretofore described, rotational direction of the output shaft 35 may be reversed.

At their eccentric ends the arms 46 and 47 are pivotally connected to the outer ends of a pair of arms 52 and 53 by means of a pair of connectors 54, 54. The opposite end portions of said arms 52 and 53 are pivotally connected together by means of an elongated headed pivotal pin 55. The parts are proportioned and arranged in a manner such that the force transmission mechanism 45 is disposed adjacent the oscillator or rockable member 24, with the arms 52 and 53 disposed in a plane which is parallel to though spaced slightly from the oscillator leg 25.

As illustrated, the leg 25 has a plurality of aligned and longitudinally spaced apart apertures or holes 56. Each of said apertures or holes is adapted for removable reception of the inner end portion of the pin 55, whereby the spacing between point of application of torque to the force transmission mechanism 45 and the axis of rotation of oscillator 24 may be selectively varied. By reason of the foregoing construction, upon rocking or oscillation of the oscillator 24, the oscillatory torque will be transmitted through said force transmission mechanism to the collars or hub extensions 48 and 49. Moreover, output shaft rotational velocity will vary in proportion to the distance between the pins 55 and 27 and, accordingly, output torque will vary inversely with such distance. Furthermore, as the oscillator rocks counterclockwise with respect to FIG. 1, the pin 55 will be carried toward the output shaft 35, causing the force transmission mechanism 45 to flatten when considered with respect to FIGS. 1 and 2. On the other hand, when the oscillator 24 rocks clockwise, the force transmission mechanism will elongate, the pin 55 then moving away from the output shaft 35. Accordingly, in each phase of the oscillator or rockable member 24, the arms 46 and 47 will rock in opposite directions about the output shaft 35. That is to say, when the oscillator rocks clockwise, arm 47 will also rock clockwise while arm 46 rocks counterclockwise. Contrariwise, when the oscillator rocks counterclockwise, the arm 47 will rock counterclockwise while the arm 46 will rock clockwise. Inasmuch as each of the collars or hub sections 48 and 49 will be tightened or bound to its respective of clutch springs 37 and 38 in the same directional phase of rotation, rotational torque in a common direction will be applied but to the output shaft 35 alternately through arms 46 and 47 to cause uni-directional rotation of said output shaft through the application of both phases of the energy of an alternating input force.

Output velocity and torque may be additionally adjusted by provision of an aperture 57 in each of the arms 46 and 47. The connectors 54 are fashioned in a manner such that they are releasably securable to the arms 46 and 47, whereby the outer ends of the arms 52 and 53 may be pivotally connected either to the eccentric end or to medial portions of the arms 46 and 47 by said last connectors to modify the characteristics of the resultant output torque. By reason of the last defined arrangement rotational velocity of the output shaft will vary inversely to the distance between said shaft and the pin 54; whereas output torque will vary in proportion to such distance.

In addition to controlling the output characteristics through adjustment of the force transmission mechanism 45, the amplitude of vibrations of the oscillator 24 may also be controlled through employment of conventional snubbers or compression springs 58 which are mounted in apertures 59, 59 in opposed sides 12, 12 to bear against opposite sides of said oscillator. Tension of the snubbers 58 may be adjusted by conventional adjusting screws 60. In alignment with the apertures 59 in each of the sides 12, 12 are a plurality of longitudinally spaced apart apertures 61 which are arranged in pairs on opposite sides of the oscillator and which are adapted for reception of said snubbers and associated said adjusting screws, whereby the amplitude of the oscillator may be controlled from selected opposed positions longitudinally of the housing 11.

As many substitutions or changes could be made in the above described construction and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:
1. In a motor having an output shaft, mechanical means responsive to an input force and including rockable means for impressing the force of input on said output shaft and adjustable means for varying the effective amplitude of said rockable means to selectively alter output torque characteristics, said adjustable means comprising arm means adapted for rotating said output shaft and arranged for motivation by said rockable means, and connection means for holding said arm means at selected positions along said rockable means, said connection means comprising a pin, said rockable means having a plurality of longitudinally spaced apertures adapted for pin reception to vary the distance of the connection of said arm means and said rockable means from the axis about which said last mentioned means is rockable.

2. In a motor having an output shaft, mechanical means responsive to an input force and including rockable means having a plurality of longitudinally spaced apart apertures for impressing the force of input on said output shaft, and adjustable means for varying the effective amplitude of said rockable means to selectively alter output torque characteristics, said adjustable means comprising a plurality of pivotally connected arm links having releasable pin means for engagement in selected of said apertures, and means for adjusting the effective length of the pivotally connected arm links, said pivotally connected arm links comprising a pair of arm members, a first thereof adapted for connection to said rockable means at selected positions longitudinally thereof and the other thereof having a plurality of holes, and connector means carried by said first arm and selectively engageable in said holes to vary the position at said other arm whereto said first arm is connected.

3. In a motor having an output shaft, means for generating a continuously alternating magnetic field, permanent magnet means arranged for interaction with said alternating magnetic field to produce a relatively oscillatory motion therebetween, a pair of collars freely rotatably mounted on said output shaft and coupled for movement in alternate directions in response to said relatively oscillatory motion, a pair of oppositely wound spring clutches each arranged about a different one of said collars and about said output shaft for alternate impression on said output shaft of both phases of said relatively oscillatory motion to produce a uni-directional rotation of said output shaft.

4. The motor of claim 3 wherein both ends of each of said pair of spring clutches are unattached to said collars and said output shaft, whereby each spring clutch alternately grips its collar to drive said output shaft in a common direction and also prevent rotation in the opposite direction when the other spring clutch releases its collar.

5. The motor of claim 3 wherein said permanent magnet means is attached to one end of a pivoted arm, said permanent magnet interacting with said alternating magnetic field to produce a rocking motion in said pivoted arm, said motor including means limiting the amplitude of oscillation of said pivoted arm to a fraction of a cycle of rotation of said output shaft, and force transmission means connectable between said arm and said collars for rotating said collars in continuously opposed directions which are a fraction of a cycle of rotation of said output shaft.

6. The motor of claim 5 wherein said force transmission means includes a scissors-like linkage means connected between said pivoted arm and each of said collars for rotating said collars in said continuously opposed directions.

References Cited
UNITED STATES PATENTS

| | | | |
|---|---|---|---|
| 2,680,970 | 6/1954 | Durkee | 74—96 |
| 2,751,773 | 6/1956 | Woodson | 192—415 X |
| 2,894,403 | 7/1959 | Tomko | 192—415 X |
| 2,959,058 | 11/1960 | Berck | 74—194 X |
| 3,202,849 | 8/1965 | Neal | 74—143 X |
| 3,320,445 | 5/1967 | Bey | 74—148 X |

FRED C. MATTERN, JR., *Primary Examiner.*

C. J. HUSAR, *Assistant Examiner.*